United States Patent
Marioni

(10) Patent No.: US 7,276,169 B2
(45) Date of Patent: Oct. 2, 2007

(54) METHOD FOR FILTERING WATER IN AN AQUARIUM, A WATER CULTIVATION TANK AND SIMILAR WATER BONDS, AND CORRESPONDING FILTERING SYSTEM

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 0 days.

(21) Appl. No.: 11/098,119

(22) Filed: Apr. 4, 2005

(65) Prior Publication Data
US 2005/0218086 A1    Oct. 6, 2005

(30) Foreign Application Priority Data
Apr. 5, 2004    (EP) .................................. 04425253

(51) Int. Cl.
*A01K 63/04* (2006.01)

(52) U.S. Cl. ................. 210/767; 210/167.21; 210/120; 210/436; 210/472; 210/416.2; 210/138; 210/141; 210/143; 119/259

(58) Field of Classification Search ................ 210/169, 210/188, 416.2
See application file for complete search history.

(56) References Cited

U.S. PATENT DOCUMENTS

| | | | | |
|---|---|---|---|---|
| 3,273,717 | A * | 9/1966 | Canterbury | 210/169 |
| 4,024,064 | A * | 5/1977 | Rakowicz et al. | 210/258 |
| 4,108,775 | A * | 8/1978 | Wilkes et al. | 210/169 |
| 4,267,042 | A * | 5/1981 | Hofmann | 210/169 |
| 4,559,136 | A * | 12/1985 | Dockery | 210/169 |
| 4,601,821 | A * | 7/1986 | Sherman et al. | 210/169 |
| 4,645,593 | A * | 2/1987 | Dunk et al. | 210/169 |
| 4,895,646 | A * | 1/1990 | Willinger | 210/169 |
| 4,934,914 | A * | 6/1990 | Kobayashi et al. | 417/423.3 |
| 5,131,821 | A * | 7/1992 | Marioni et al. | 417/423.3 |
| 5,160,431 | A * | 11/1992 | Marioni | 210/167.23 |
| 5,160,607 | A * | 11/1992 | Thiemer et al. | 210/128 |
| 5,160,622 | A * | 11/1992 | Gunderson et al. | 210/617 |
| 5,242,582 | A * | 9/1993 | Marioni | 210/151 |
| 5,277,800 | A * | 1/1994 | Dieckmann et al. | 210/169 |
| 5,292,431 | A * | 3/1994 | Romagnoli | 210/127 |
| 5,294,335 | A * | 3/1994 | Chiang | 210/169 |

(Continued)

FOREIGN PATENT DOCUMENTS

EP    411559 A2 *    2/1991

(Continued)

*Primary Examiner*—Robert James Popovics
(74) *Attorney, Agent, or Firm*—Akerman Senterfitt

(57) ABSTRACT

A method for filtering the water of an aquarium, a water cultivation tank or similar water bonds, by means of a filtering system comprising a closed vessel and defining a chamber, a filtering body housed in the chamber, a circulation pump having a suction duct, communicating with the aquarium by interposition of a siphon and a delivery duct communicating with the aquarium. Vent means are also provided to eject the air from the chamber. The method comprises the steps of: filling the filtering body with a predetermined amount of water; starting the pump; short-circuiting the pump by means of a fluid passage by putting the delivery duct in communication with the closed vessel; keeping the pump short-circuited at least up to determine the siphon trigger; subsequently stopping the pump; keeping the pump stopped to allow the air to escape from the chamber and the filtering body to be filled with water; re-starting the pump.

13 Claims, 3 Drawing Sheets

U.S. PATENT DOCUMENTS

| | | | | |
|---|---|---|---|---|
| 5,336,401 | A * | 8/1994 | Tu | 210/169 |
| 5,397,463 | A * | 3/1995 | Woltmann | 210/151 |
| 5,401,401 | A * | 3/1995 | Hickok et al. | 210/169 |
| 5,449,454 | A * | 9/1995 | Hickok | 210/188 |
| 5,474,674 | A * | 12/1995 | Bresolin et al. | 210/169 |
| 5,514,280 | A * | 5/1996 | Logan | 210/617 |
| 5,567,315 | A | 10/1996 | Weidenmann et al. | |
| 5,807,480 | A * | 9/1998 | Kanazawa | 210/120 |
| D428,109 | S * | 7/2000 | Mayer | D23/210 |
| 6,187,179 | B1 * | 2/2001 | Mayer et al. | 210/109 |
| 6,375,833 | B1 * | 4/2002 | Marston et al. | 210/85 |
| 6,415,103 | B2 * | 7/2002 | Bresolin | 392/471 |
| D477,050 | S * | 7/2003 | Goodwin | D23/209 |
| 6,645,376 | B2 * | 11/2003 | Marioni | 210/169 |
| 6,712,961 | B2 * | 3/2004 | Chauquet | 210/169 |
| 6,746,219 | B1 * | 6/2004 | Chen | 417/424.1 |
| 6,764,597 | B2 * | 7/2004 | Chauquet | 210/169 |
| 2002/0001461 | A1 * | 1/2002 | Bresolin | 392/471 |
| 2003/0015464 | A1 * | 1/2003 | Marioni | 210/169 |
| 2004/0115078 | A1 * | 6/2004 | Chen | 417/424.1 |
| 2004/0164011 | A1 * | 8/2004 | Geudtner | 210/169 |
| 2005/0218086 | A1 * | 10/2005 | Marioni | 210/767 |
| 2006/0096900 | A1 * | 5/2006 | Marioni | 210/106 |
| 2006/0157395 | A1 * | 7/2006 | Marioni | 210/169 |

FOREIGN PATENT DOCUMENTS

| | | | |
|---|---|---|---|
| EP | 461590 | A2 * | 12/1991 |
| EP | 484896 | A1 * | 5/1992 |
| EP | 1277398 | A1 * | 1/2003 |
| EP | 1642631 | A1 * | 4/2006 |
| EP | 1654929 | A1 * | 5/2006 |
| FR | 2767875 | A3 * | 3/1999 |
| IT | 1 254 103 | B | 9/1995 |

* cited by examiner

METHOD FOR FILTERING WATER IN AN AQUARIUM, A WATER CULTIVATION TANK AND SIMILAR WATER BONDS, AND CORRESPONDING FILTERING SYSTEM

FIELD OF APPLICATION

The present invention relates to a method for filtering the water of an aquarium, a water cultivation tank and similar water bonds.

More particularly, the present invention relates to a method being suitable for filtering considerable volumes of water.

The method according to the present invention provides the use of a water-forced-circulation filtering system comprising a closed vessel defining a chamber, a filtering body housed in the chamber and a fluid circulation pump having a suction duct communicating with the aquarium by interposition of a siphon and a delivery duct also communicating with the aquarium. The filtering body is interposed between the suction duct and the pump to let water pass therethrough. Vent means are also provided to eliminate the air from the chamber.

Preferably, but not exclusively, the filtering body is suitable for filtering water both mechanically, i.e. by removing particulates, and biologically, i.e. though the conditioning action performed by bacterial cultures.

The present invention also relates to said filtering system.

PRIOR ART

Known is the need to realise aquarium filtering systems being capable of filtering considerable volumes of water, generally comprised between about 500 and 2000 liters.

In order to meet this requirement, some filtering systems have been developed, which comprise a closed vessel wherein a filtering body is located, having big-sized filtering masses with very dense porous structures. The vessel is associated to a circulation pump, located in communication with the filtering body. The pump has a suction duct, located in communication with the aquarium by means of a siphon, and a delivery duct also located in communication with the aquarium.

In particular, filtering masses are interposed between the circulation pump and the suction duct. Therefore, when the pump is started, the water, under the effect of the pressure determined by the pump in the vessel, is forced to flow from the suction duct through the masses for being filtered.

Water is then ejected clean in the aquarium through the delivery duct.

Known filtering systems can also comprise a vent valve or other devices, being operated by hand or automatic, allowing the air which was originally in the vessel, or which is sucked by the suction duct when the pump is started, to be eliminated from the vessel itself, and preventing filtering masses from being completely filled with water.

In fact it is known that the filtering masses must be completely filled, or at least with a sufficiently high amount of water, to ensure both an effective water circulation in the vessel and a continuous water suction in the pump.

However, filling the filtering masses is very demanding and onerous for a user, since the filtering masses are big-sized and at least some tens of liters of water are required to ensure an effective pump start-up. Moreover, with the so-called biological filters, the filtering masses have very dense porous structures wherein water is absorbed very slowly.

This drawback is much more evident considering the fact that water circulation must be cyclically interrupted to allow filtering masses to be replaced or cleaned. Consequently, each time filtering masses are removed from the system, the filling operation must be always repeated.

SUMMARY OF THE INVENTION

The problem underlying the present invention is to provide a filtering method and corresponding filtering system as above described allowing the cited drawbacks to be overcome, i.e. allowing a big-sized filtering body having high-pore-density masses to be easily and completely filled, with no need to perform demanding operations by hand, or to use expensive devices.

This problem is solved, according to the present invention, by an aquarium water filtering method by means of a filtering system as above described, comprising the steps of
  filling the filtering body with a predetermined amount of water;
  starting the pump;
  short-circuiting the pump by means of a passage by putting the delivery duct in fluid communication with the closed vessel;
  keeping the pump short-circuited at least up to determine the siphon trigger, to allow water to be transferred from the aquarium to the vessel;
  subsequently stopping the pump;
  keeping the pump stopped to allow the air to escape from the chamber and the filtering body to be filled with water;
  re-starting the pump.

Further features and the advantages of the invention will be apparent from the description given hereafter of an embodiment thereof, made by way of non-limiting example with reference to the attached drawings.

DETAILED DESCRIPTION OF A PREFERRED EMBODIMENT

Figure 1:
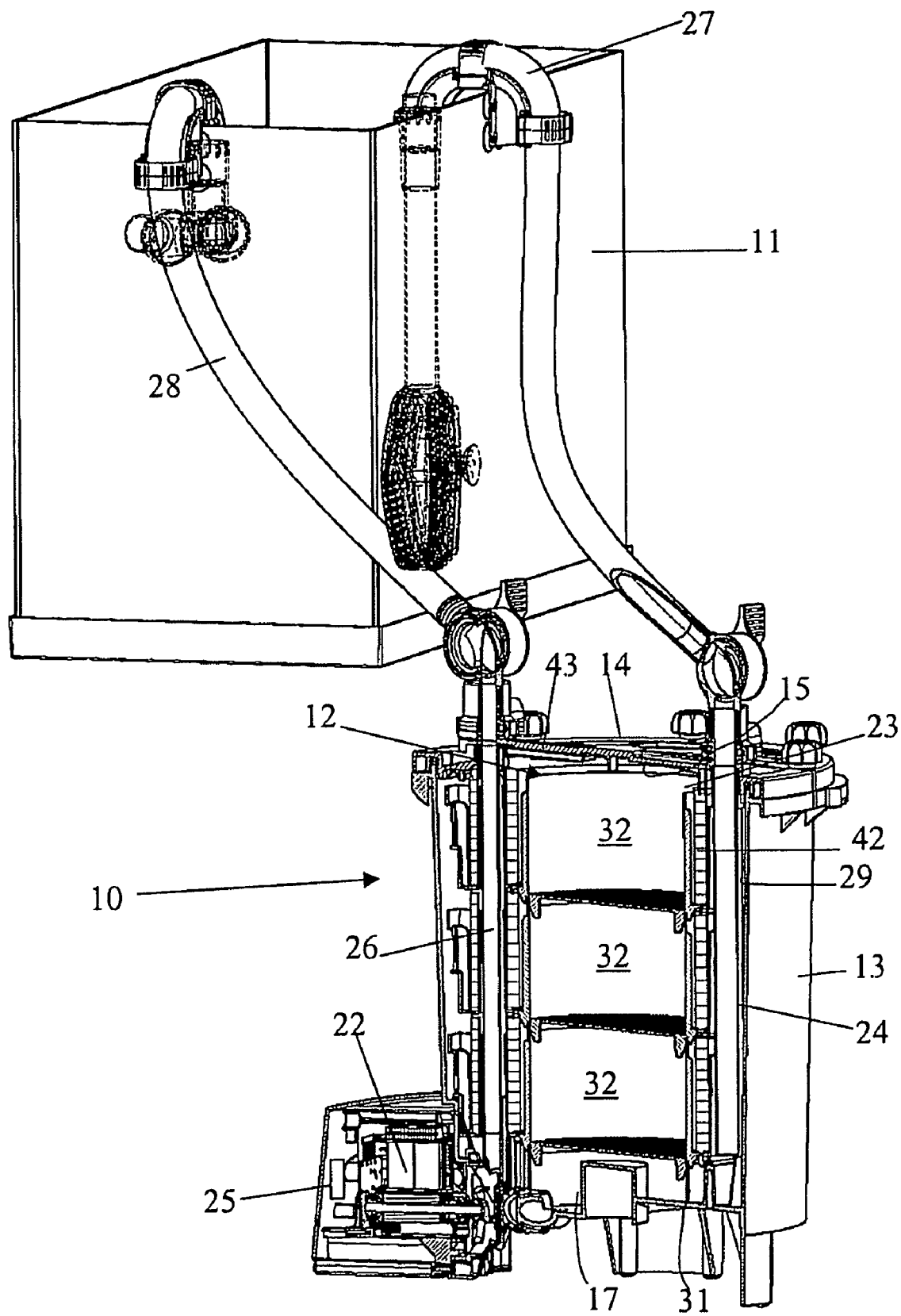
FIG. 1 schematically shows a filtering system according to the present invention associated to an aquarium.

With reference to said figures, a filtering system for aquariums, water cultivation tanks and similar water bonds, for implementing the method according to the invention, is globally indicated with the number 10.

The present invention also relates to the filtering system 10.

In this specific case, and as it will be better described hereafter, the filtering system 10 is adapted to filter water both mechanically and biologically.

The filtering system 10 is suitable for being located outside an aquarium 11 having high water capacities, generally comprised between 500 and 2000 liters or more.

In particular, the filtering system 10 is at the bottom of the aquarium 11, on one side, or below it, so to be at a lower level with respect thereto.

The filtering system 10 comprises a vessel 13, hermetically closed by means of a lid 14 and defining a chamber 15, and a filtering body 12, which is housed in the chamber 15.

The filtering system 10 according to the invention is of the forced-circulation type and it comprises a fluid circulation pump 22, which is in communication with the vessel 13 in order to create therein a predetermined pressure.

According to a first feature of the invention the fluid circulation pump 22 is located in correspondence with a bottom area 17 of the vessel 13, corresponding in this case to the bottom of the filtering body 12.

This position, in correspondence with the bottom of the vessel 13, ensures that the pump 22 is below the liquid head inside the vessel 13, even when the amount of water in the vessel is small, so that the filtering body 12 must not necessarily be completely filled with water to start the water suction in the pump.

The expression "vessel bottom area" thus means in the range of the present invention an area located below the liquid head in the vessel 13.

The circulation pump 22 is preferably controlled by means of an electronic board 25, schematically shown in the figures, which is configured for turning the pump 22 on and off according to predetermined modes and times, as it will described in greater detail hereafter.

The filtering system 10 has also a suction duct 24 and a delivery duct 26, which are in fluid communication with the aquarium 11.

In particular, the suction duct 24 is connected to the aquarium 11 by interposition of a siphon 27, which allows water to be transferred, while the delivery duct 26 is connected to the aquarium by means of a pipe 28.

In this specific case, besides the filtering body 12, the suction duct 24 and the delivery duct 26 are also housed in the vessel 13. Preferably, the delivery duct 24 is located even near the bottom 17 of the vessel 13.

In particular, inside the vessel 13, the filtering body 12 is located in a central area of the chamber 15, while the suction 24 and delivery 26 ducts are located on opposite sides of the filtering body 12 in a peripheral substantially ring-shaped area 29 surrounding the filtering body 12.

The filtering body 12 is thus interposed between the circulation pump 22 and the suction duct 24, to be subsequently crossed by water, when the vessel 13 is brought under pressure.

The filtering body 12 comprises a plurality of baskets 30, tightly overlapped onto each other and supported on vertical ribs 31 obtained on the bottom 17 of the vessel 13. Baskets 30 vertically extend near the lid 14, so as to leave a port in a top area 23 of the vessel 13.

Each basket 30 comprises a drilled base wall 33 and a pair of ring-shaped concentric vertical walls, an external 37 and an internal 38 wall.

The external wall 38 is drilled, while the internal wall 38 is closed, and it splits the corresponding basket 30 into a central space 32 and an external ring-shaped housing 35.

Therefore, the central spaces 32 and the external ring-shaped housings 35 are, in this specific case, communicating in the top area 23.

Moreover, the central spaces 32 are adapted to contain a biological filter, not shown in the drawings, comprising a series of very porous masses made of a plastic or ceramic inert material. These masses are characterised by a high surface-volume ratio and they are suitable for housing bacterial floras adapted for the water biological filtering.

On the contrary, the external ring-shaped housings 35 contain a mechanical filter 42 comprising a series of spongy masses, which are generally made of polyurethane and which are adapted to hold the particulate contained in the just-sucked water.

A water mechanical and biological filtering path extending between the peripheral area 29 and the central area of the chamber 15 can thus be obtained with the pump 22 steady state.

Figure 2:
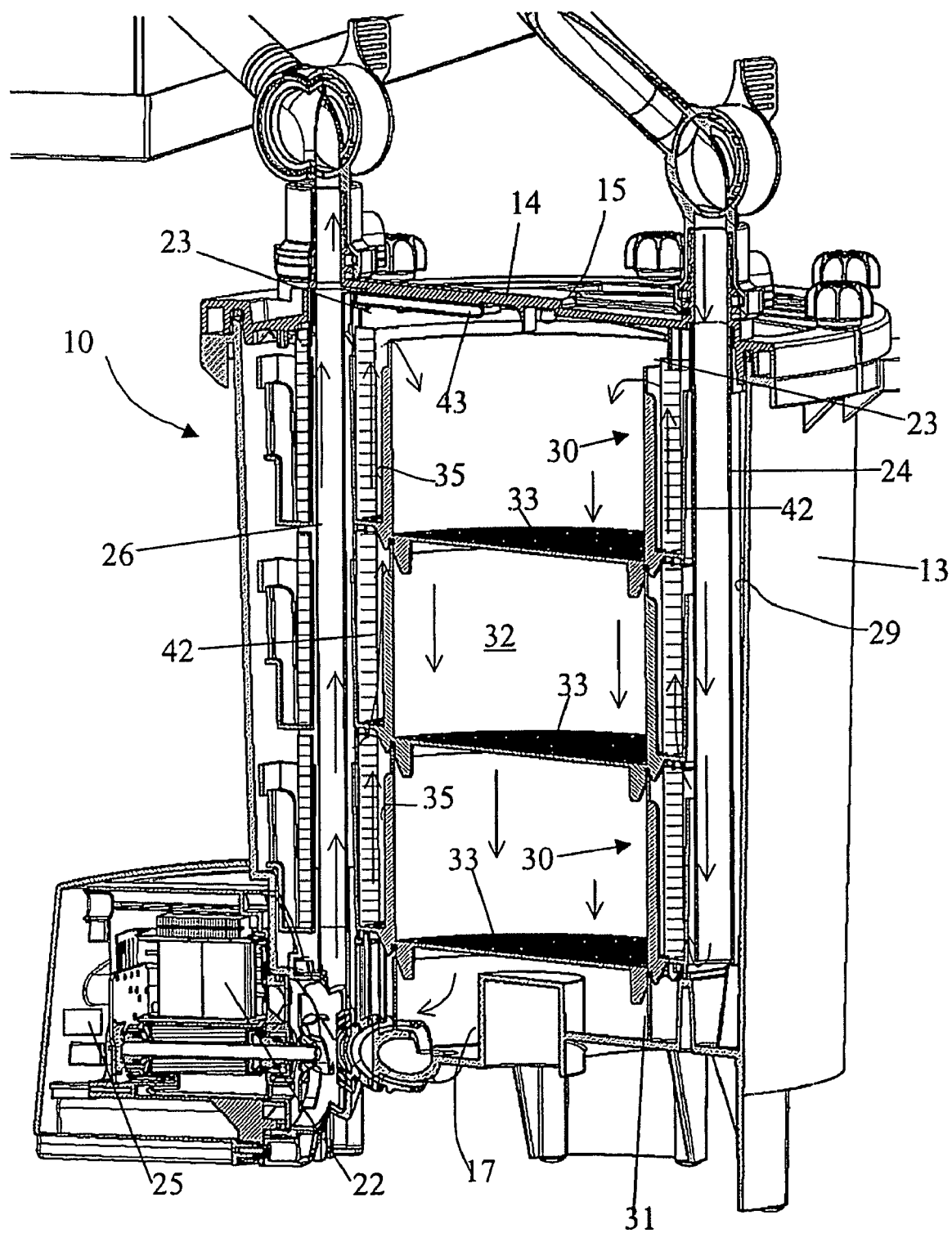
FIG. 2 is a schematic enlarged-scale view of a detail of the filtering system of FIG. 1.
Figure 3:
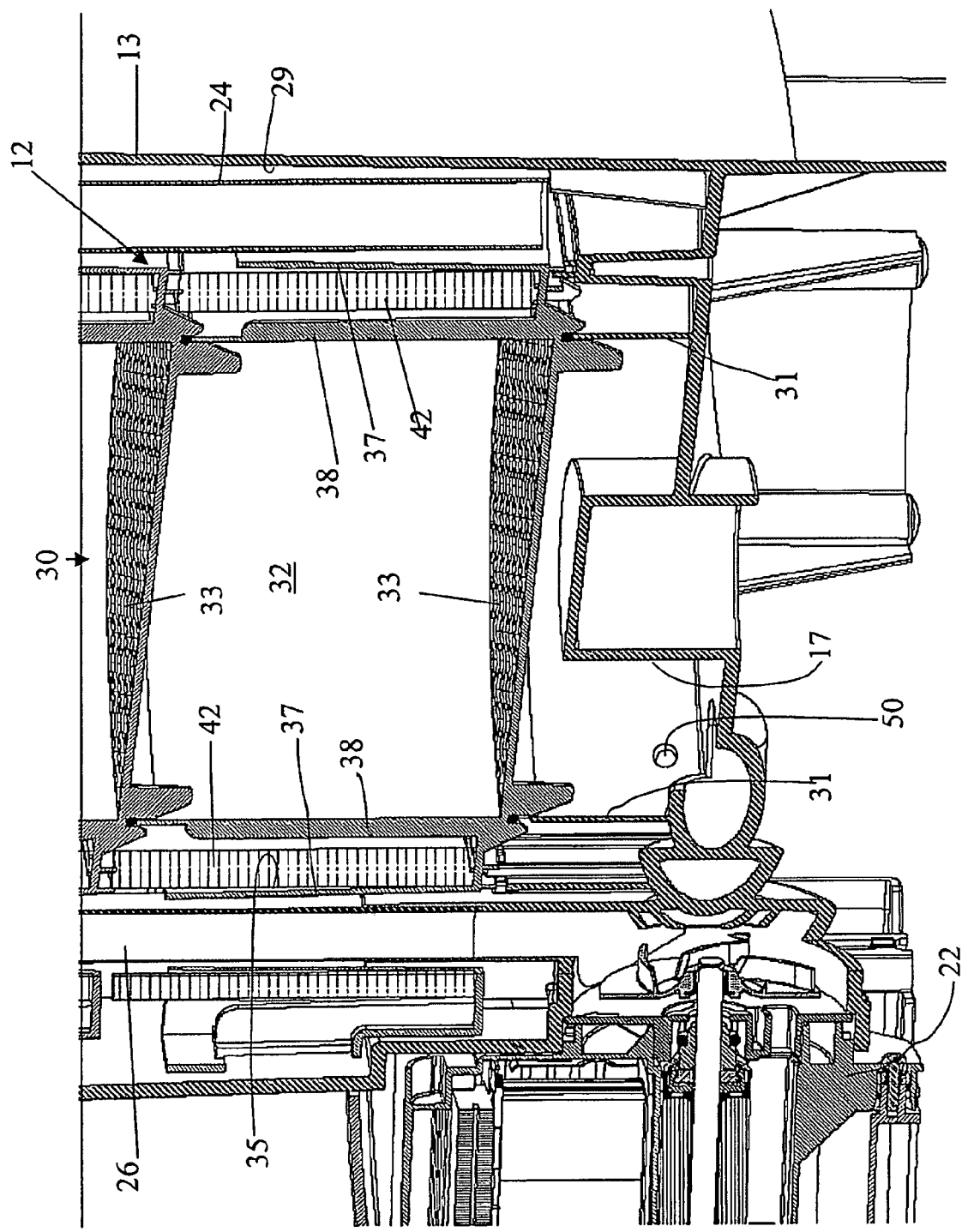
FIG. 3 is an enlarged-scale detail of FIG. 2.

In particular, as indicated by the arrows in FIG. 2, the water coming from the suction duct 24 floods the peripheral area 29 and, passing through the mechanical filter 42, it goes up to near the upper area 23 and it goes down again through the biological filter, wherefrom it is ejected in the delivery duct 26 by means of the circulation pump 22.

According to another feature of the present invention, the filtering system 10 comprises a fluid passage, which puts the delivery duct 26 in fluid communication with the vessel 13.

In this specific case the fluid passage comprises a connection duct 43.

According to an alternative embodiment, not shown in the figures, a hole is provided instead of the connection duct 43.

The connection duct 43 is located substantially horizontally and it is almost an offtake, with a smaller diameter, of the delivery duct 26. Preferably, the connection duct 43 is conveniently sized so that, when the pump is on, at least a portion of the overall flowing water can flow from the delivery duct 26 to the filtering body 12.

Obviously, the portion of water passing in the duct 43 is inversely proportional to the resistances along the connection pipe 28 to the aquarium 11 and, respectively, along the connection duct 43.

Moreover, the connection duct 43 is preferably obtained in the upper area of the vessel 13 close to the lid 14, so as to be located above the filtering body 12.

This position allows the connection duct 43 to serve as a vent device of the chamber 15, when starting the operating method of the circulation pump 22 according to the present invention, which is described in detail hereafter.

According to another feature of the present invention, the filtering system 10 can comprise an offtake opening 50, in this case a duct, which is preferably obtained, between the peripheral area 29 and the bottom area 17 of the vessel 13, below the baskets 30, to put the suction duct 24 in direct communication with the bottom area 17, and thus with the circulation pump 22.

The offtake duct 50 has a relatively reduced diameter with respect to the peripheral area 29, so that only a minimum amount of water is diverted from the normal upward path through the mechanical filter 42.

The offtake hole (or duct) 50 aims at favouring the filling operations preceding the pump start-up. Without this hole it is necessary to fill the filter central space and the filter must therefore be opened. Vice versa, the hole 50 allows the water required for the first pump start-up to be inserted also through the suction duct 24 (removing the tap) without being thus obliged to open the filter lid. In fact in this case the water, through said hole 50, can pass from the chamber 29 to the filter central area.

The filtering method by means of the filtering system 10 according to the invention develops as follows.

In a first step, the circulation pump 22 is off, and the filtering body 12 is partially filled with a predetermined amount of water. Preferably, the filling is carried out by hand from the top of the vessel 13, after removing the lid 14.

The amount of water required to initially wet the filtering body 12 is, according to the invention, a small amount, not requiring any responsibility of an operator, and such as to ensure an initial water circulation in the filtering system 10.

Preferably, the filtering body 12 is filled by hand with a simple bottle.

Afterwards the suction and delivery ducts 24, 26 are connected to the aquarium 11 respectively by means of the siphon 27 and the pipe 28.

The pump 22 is started, for a first time interval, controlled by the corresponding electronic board 25. The little water contained in the filtering body 12 is introduced in the delivery duct 26.

As above mentioned, a portion of the overall water is reintroduced from the delivery duct 26 in the filtering body 12 by means of said connection duct 43.

The generated pressure also determines the water suction from the aquarium 11 by means of the siphon 27, which is thus triggered.

The trigger of the siphon 27 also causes the transfer of the air, initially being in the suction duct 24, in the upper area of the filtering mass 12.

A stable state is thus created, wherein a predetermined amount of water is sucked from the aquarium 11 and ejected from the delivery duct 26. Meanwhile the connection duct 43, allowing a continuous circulation of a part of water, ensures the pump 22 operation.

Under this condition, the filtering body 12 is only partially filled, since the air in the upper part 23 of the filtering body 12 can be ejected in no way.

In this situation, the pump 22, always controlled by the electronic board 25, is turned off for a second time interval, simultaneously interrupting the circulation in the connection duct 43.

This allows water to continue entering the filtering body 12 through the suction duct 24, through the action of the siphon 27 (triggered).

The water introduced by the siphon 27 further pushes the air contained in the upper part 41 of the filtering body 12 and, due to the fact that the circulation pump 22 is off, it can be ejected through the connection duct 43 and conveyed to the aquarium by means of the pipe 28.

The connection duct 43 thus serves, as above mentioned, as a vent duct of the chamber 15, just exploiting the fact that the pump 22 is off.

In other words, due to the presence of the connection duct 43, a rapid air escape is obtained, bypassing the pump 22.

Therefore the filtering body 12 can be completely filled with water without requiring further operations.

It must be noticed that, due to the fact that the suction duct 24 is near the bottom 17 of the vessel 13, it is certain that it is below the water level in the vessel. Therefore, an air reflow in the suction duct is avoided when the pump 22 is turned off.

Once the filtering body 12 is filled with water and the air has completely escaped, the pump 22 is restarted, always controlled by the electronic board 25, allowing the filtering system 10 to efficiently operate.

At this point, the filtering system 10 can operate in the steady state, as above mentioned, for a time interval, which is even quite long.

Preferably, the size of the vessel 13, and consequently the size of the filtering mass 12 and the power of the pump 22 are chosen so as to allow said stable condition to be rapidly reached, wherein the siphon 27 is triggered, and even the filtering body 12 to be rapidly filled.

Reasonable times being provided for triggering the siphon and filling the filtering mass 12 are for example in the range of some minutes.

In a preferred solution, the filtering system is configured so that the pump 22 is initially started for 120 seconds until the trigger of the siphon 27, it is then interrupted for further 120 seconds until the total filling of the filtering mass 12 and it is finally restarted for a period of 24 hours, after which the cycle is repeated.

A method for filtering the water of an aquarium, a water cultivation tank or similar bonds can be set up by means of the filtering system 10 being just described, comprising the steps of
- filling the filtering body (12) with a predetermined amount of water;
- starting the pump (22);
- short-circuiting the pump (22) by means of a passage (43) by putting the delivery duct (26) in communication with the closed vessel (13);
- keeping the pump (22) short-circuited at least up to determine the siphon (27) trigger, to allow water to be transferred from the aquarium to the vessel (13);
- subsequently stopping the pump (22);
- keeping the pump (22) stopped to allow the air to escape from the chamber (15) and the filtering body (12) to be filled with water;
- re-starting the pump (22).

Preferably, the escape is performed through the same fluid passage, i.e. the connection duct 43, thus ejecting the air in the delivery duct 26.

The expression "short-circuiting the pump 22" means that the pump is inserted in a closed circuit inside the filtering system 10, which has a reduced size with respect to the overall water circulation in the aquarium 11, and it is substantially formed by the vessel 13, the pump 22, the delivery duct 26 and the connection duct 43. In this closed circuit, the pump 22 continually ejects and sucks water only within the filtering system 10.

The main feature of the method and filtering system 10 according to the present invention results from the combination of the pump position in correspondence with the vessel bottom and of the presence of the fluid passage which keeps the pump 22 short-circuited and the delivery duct 26 in constant communication with the filtering body 12.

Moreover, another advantage is that the fluid passage, when obtained in the vessel top area, can serve both as a recycle of the water being initially in the filtering body 12 and as an air vent duct.

The advantage is mainly that just when the pump is stopped and the siphon is triggered, the air introduced is ejected just through the same fluid passage.

Moreover it must be noticed that, to completely fill the filtering body and escape the air, the same water circulation pump is used, without requiring the use of supplementary devices.

In fact it is sufficient to use a simple programmable electronic board, to be associated to the pump, configuring predetermined operation modes and times.

It is however clear that a filtering system, wherein the fluid passage for water recycle and the air vent passage are two different elements, i.e. two structurally independent duct sections, also falls in the range of the present invention.

In this case conveniently driven valves are provided to close either passage according to the pump operating step.

Still another advantage of the present invention is that the filtering system can be programmed to operate cyclically, for example every 24 hours, always ensuring the ejection of the air accidentally entering the filter.

The invention claimed is:

1. A method for filtering the water of an aquarium, a water cultivation tank or similar water ponds, by means of a filtering system comprising a closed vessel and defining a chamber, a filtering body housed in the chamber, a circulation pump having a suction duct, an outlet of the suction duct being placed in a bottom area of the vessel, and the circulation pump communicating with the aquarium by interposition of a siphon and a delivery duct communicating with the aquarium, and vent means for ejecting air from the chamber, the method comprising the steps of:

partially filling the filtering body with a predetermined amount of water;

starting the pump;

short-circuiting the pump by a fluid passage by putting the delivery duct in communication with the closed vessel;

keeping the pump short-circuited at least until the siphon is triggered or activated, to allow water to be transferred from the aquarium to the vessel;

subsequently stopping the pump;

keeping the pump stopped to allow the air to escape from the chamber and the filtering body to be filled with water; and re-starting the pump once the filtering body is filled with water and the air has completely escaped.

wherein a time and a mode of operation of the pump is controlled using a programmable electronic control board.

2. A method according to claim 1, wherein the escape is performed through the passage, ejecting the air in the delivery duct.

3. A method according to claim 1, wherein said steps are performed cyclically according to a program of said electronic control board.

4. A filtering system suitable for being associated to an aquarium, a water cultivation tank or similar water ponds, comprising a closed vessel and defining a chamber, the filtering system comprising:

a filtering body housed in the chamber;

a fluid circulation pump having a suction duct;

said circulation pump communicating with the aquarium by interposition of a siphon and a delivery duct communicating with the aquarium;

a programmable electronic control board for controlling a time and a mode of operation of said circulation pump;

vent means communicating with the chamber, said filtering body being interposed between the suction duct and the circulation pump; and a fluid passage which puts the delivery duct in communication with the vessel, wherein said circulation pump is located in correspondence with a bottom area of the vessel.

5. A filtering system according to claim 4, wherein said passage is located near a top area of the vessel.

6. A filtering system according to claim 5, wherein said passage serves as an airvent and/or a water recycle of said chamber.

7. A filtering system according to claim 4, wherein said passage comprises a duct.

8. A filtering system according to claim 7, wherein the fluid passage duct for water recycle and the air vent passage comprise two different duct sections.

9. A filtering system according to claim 4, wherein said vessel comprises a central area wherein said filtering body is located, and communicating with said pump and a peripheral area communicating with said suction duct.

10. A filtering system according to claim 9, wherein said suction duct is inserted in said peripheral area of the vessel near the bottom thereof.

11. A filtering system according to claim 9, further comprising an offlake opening suitable for puffing said peripheral area, wherein said suction duct is located, in direct communication with said central area of said vessel.

12. A filtering system according to claim 4, wherein said filtering body comprises a central space for housing a biological filter and at least a peripheral housing, suitable for housing a mechanical filter.

13. A filtering system according to claim 4, wherein said electronic control board is programmed to operate said circulation pump cyclically.

* * * * *